United States Patent [19]

Fralick

[11] Patent Number: 4,685,240
[45] Date of Patent: Aug. 11, 1987

[54] ICE FISHING TIP-UP

[76] Inventor: Ilo Fralick, Box 394, Martin, S. Dak. 57551

[21] Appl. No.: 753,601

[22] Filed: Jul. 10, 1985

[51] Int. Cl.⁴ .......................................... A01K 97/12
[52] U.S. Cl. ........................................ 43/17; 43/16
[58] Field of Search ............................... 43/15, 16, 17

[56] References Cited

U.S. PATENT DOCUMENTS

| | | | |
|---|---|---|---|
| 2,506,092 | 5/1950 | Lyons | 43/17 |
| 2,785,493 | 3/1957 | Thiel | 43/17 |
| 2,811,802 | 11/1957 | Schmidt | 43/17 |
| 2,897,622 | 8/1959 | Belke | 43/17 |
| 2,934,849 | 5/1960 | Kampa | 43/17 |
| 2,977,704 | 4/1961 | Tinsley | 43/17 |
| 3,134,188 | 5/1964 | Petersen | 43/17 |
| 3,474,561 | 10/1969 | McConkey | 43/16 |
| 3,578,748 | 5/1971 | Hurd | 43/17 |
| 3,745,689 | 7/1973 | Williams | 43/17 |
| 3,807,078 | 4/1974 | Bartys | 43/17 |
| 4,120,111 | 10/1978 | Young | 43/17 |
| 4,270,297 | 6/1981 | Yates | 43/17 |
| 4,285,154 | 8/1981 | Grahl | 43/17 |
| 4,373,287 | 2/1983 | Grahl | 43/17 |
| 4,393,615 | 7/1983 | Hodshire | 43/15 |

Primary Examiner—M. Jordan
Attorney, Agent, or Firm—Fulwider, Patton, Rieber, Lee & Utecht

[57] ABSTRACT

An ice fishing tip-up having a fishing reel horizontally mounted on a base plate, an alert pole, and a retainer to hold the alert pole in a horizontal position adjacent the fishing reel. When a fish strikes the line, the reel rotates, and a trip member on the reel engages the alert pole, pushing it out from under the retainer. A spring then snaps the alert pole into a vertical position. The alert pole is detachable from the base plate for convenient storage.

4 Claims, 3 Drawing Figures

ICE FISHING TIP-UP

BACKGROUND OF THE INVENTION

1. Field of the Invention

The present invention relates generally to fishing equipment, and more particularly to an ice fishing tip-up that automatically displays a visible signal when a fish strikes a fishing line attached thereto.

2. The Prior Art

An ice fisherman typically fishes a plurality of holes simultaneously by placing a different fishing line through each of the holes into the water below the ice. Since the fisherman cannot personally attend all the holes being fished, signal devices may be attached to the various lines to alert the fisherman when a fish has taken the hook on a particular line. Such signaling devices, commonly called "tip-ups", generally utilize a horizontal arm, center-pivoted in such fashion that when a fish strikes a line attached to one end of the arm, the opposite end will be raised. A flag may be attached to the raised end to attract the fisherman's attention. An example of such a device is the apparatus disclosed in U.S. Pat. No. 2,752,716, issued to Porter on July 3, 1956.

Existing ice fishing tip-ups tend to be mechanically complex. Besides being costly to manufacture, such complex devices are difficult to use in cold weather conditions such as those generally encountered when ice fishing. In addition, such devices are often bulky and therefore clumsy to move about and difficult to store conveniently. Accordingly, there is a need for an ice fishing tip-up that is mechanically simple and that is easy to store and move from place to place on the ice. The present invention satisfies this need.

SUMMARY OF THE INVENTION

The present invention is embodied in an ice fishing tip-up of simple construction that is easily stored and that is simple to set up and to move about on the ice.

In accordance with the invention, an ice fishing tip-up has a base plate that can straddle a hole in the ice. A fishing reel is horizontally mounted on the base plate, and the reel has a trip member that moves through an arc as the reel rotates. A length of fishing line extends from the reel across a guide and through an opening in the base plate, from whence it passes through a hole in the ice into the water below. Opposite the reel, one end of an alert pole is affixed to the base plate such that the pole can pivot around its point of attachment from a horizontal waiting position to a vertical alert position. A retainer such as a hook is mounted on the base plate and disposed to retain the pole in the waiting position until a fish pulls on the fishing line.

When a fish bites, the reel rotates and the trip member moves through its arc, pushing against the pole and disengaging it from the retainer. A biasing device such as a spring then pushes the pole into the alert position, signaling a nearby fisherman that a fish has bitten.

The present invention is mechanically very simple, having (besides the reel itself) only one moving part—the pole. Such a device is easy to use even in extremely cold weather and is not subject to being blown over by wind; it is also easy to move from place to place on the ice as desired. For convenience in storage, the alert pole may be detached from the base plate, thereby providing for storage a detached pole and a relatively flat base plate, a combination that is easy to store.

Optionally, the fishing reel may include an adjustable friction clamp to prevent an alert signal from being given unless a pull of a predetermined magnitude is exerted on the fishing line.

It will be appreciated from the foregoing that the present invention represents a significant advance in the field of ice fishing tip-ups in that an ice fishing tip-up is provided that has great mechanical simplicity and that is easy to store and to move from place to place. Other aspects and advantages of the present invention will become apparent from the following more detailed description taken in conjunction with the accompanying drawings.

DESCRIPTION OF THE PREFERRED EMBODIMENT

The present invention provides an ice fishing tip-up that is mechanically very simple, that is easy to use in cold weather, and that can conveniently be stored in minimal storage space.

Figure 1:
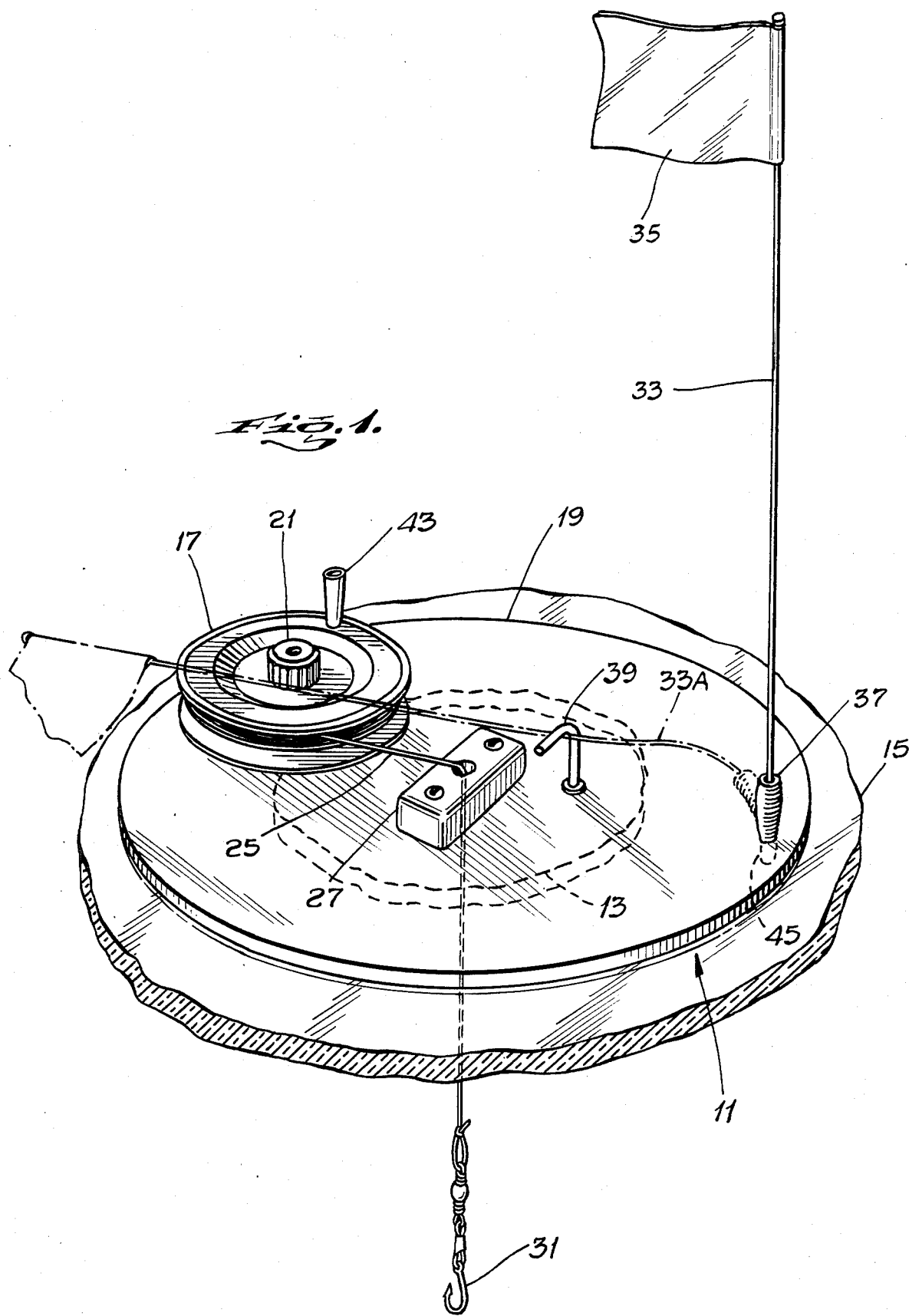
FIG. 1 is a perspective view of an ice fishing tip-up according to the present invention.
Figure 2:
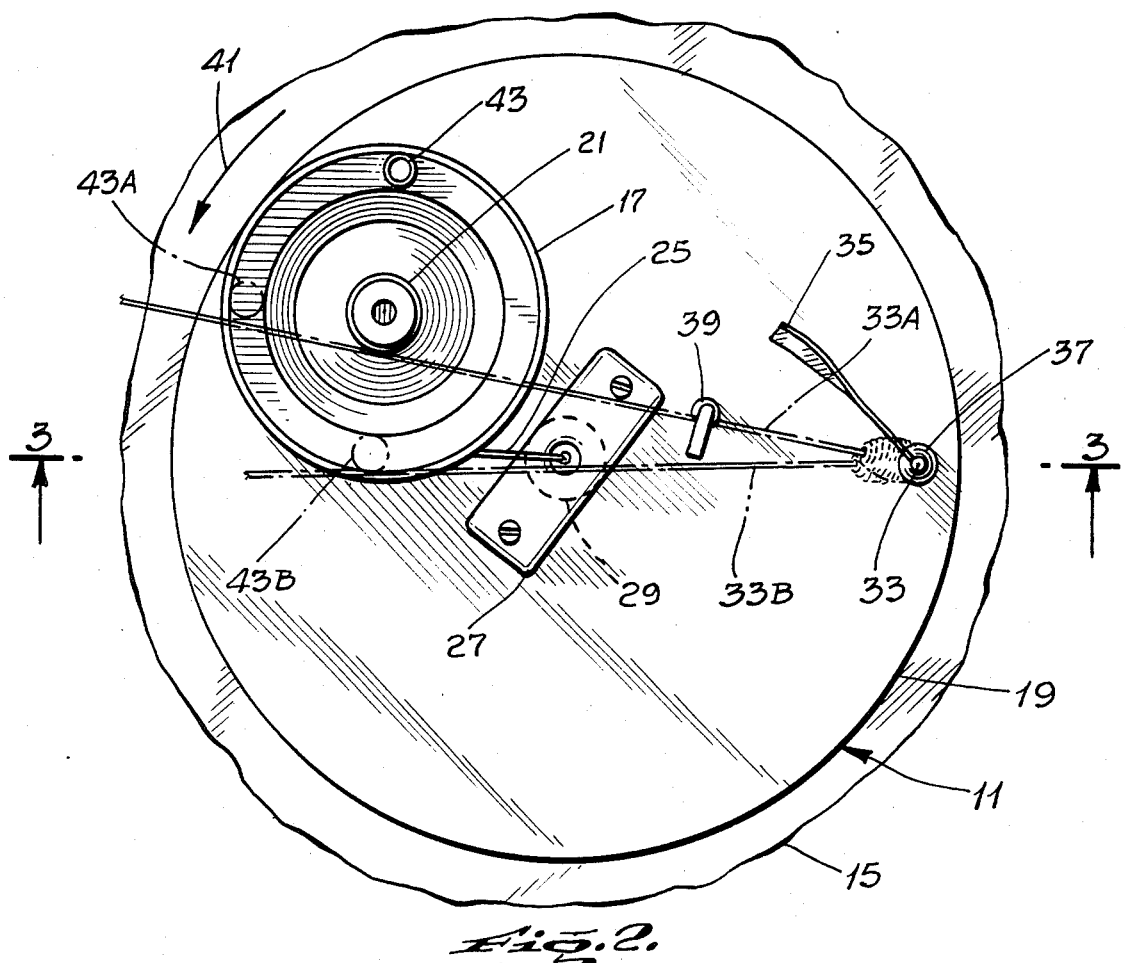
FIG. 2 is a top plan view of the tip-up of FIG. 1.
Figure 3:
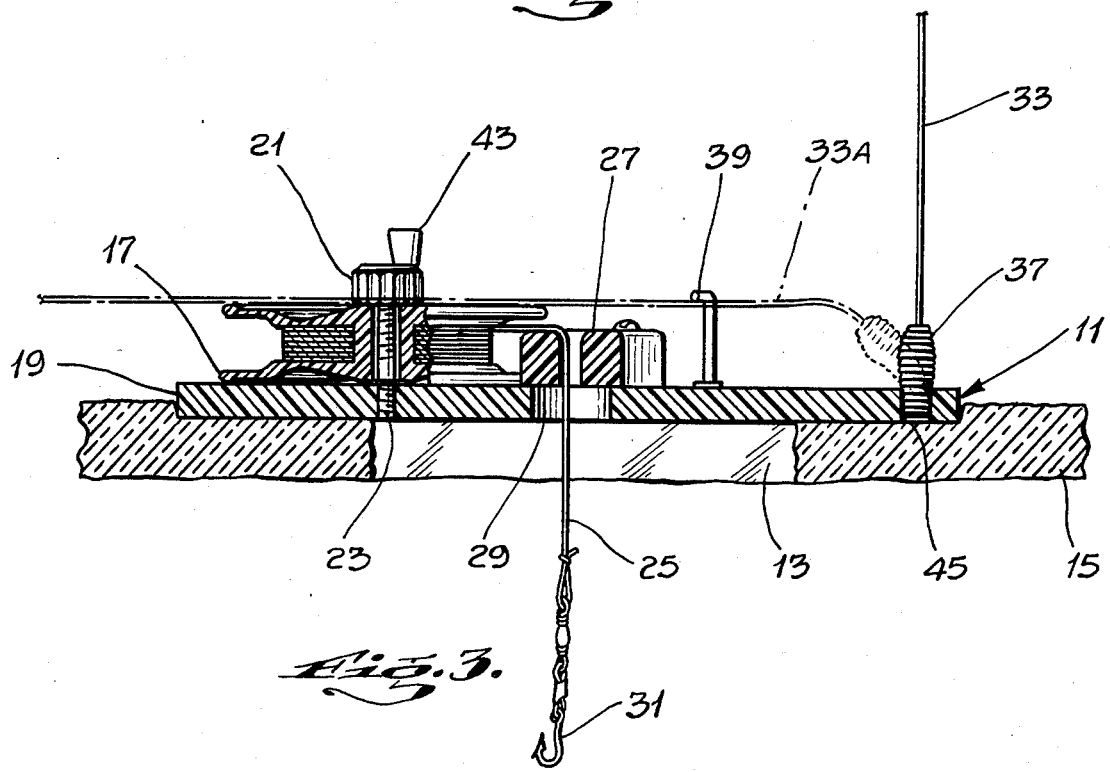
FIG. 3 is a section view taken along the line 3—3 of FIG. 2.

In accordance with the invention, an ice fishing tip-up, designated generally as 11, is positioned over a hole 13 in ice 15, as shown in FIGS. 1 through 3. A fishing reel 17 is secured to a base plate 19 by a nut 21 on a shaft 23, but is free to rotate. If the nut 21 is tightened, friction between it and the reel 17 tends to resist rotation of the reel, and by adjusting the degree of tightness of the nut 21, a fisherman can regulate the amount of torque that must be applied to the reel 17 before it will begin to rotate. A length of fishing line 25 is wound on the reel 17 and is guided by a guide 27 through a hole 29 in the base plate 19, from whence the fishing line 25 passes through the hole 13 into the water below the ice 15. A hook 31 or the like may be attached to the fishing line 25.

An alert pole 33, carrying a flag 35, is attached to the base plate 19 by a spring 37. A retainer 39 is attached to the base plate 19 between the alert pole 33 and the fishing reel 17.

In operation, the alert pole 33 is initially placed in a horizontal waiting position 33A. In the waiting position 33A, the alert pole 33 passes under the retainer 39 and across the reel 17. When a fish strikes the fishing line 25, the reel 17 rotates as indicated by arrow 41. The reel 17 has a trip 43 mounted near its outer circumference, and as the reel 17 rotates, the trip 43 moves toward the alert pole 33 lying across the reel 17. When the trip 43 reaches an intermediate position 43A, it contacts the alert pole 33. The trip 43 continues its travel, pushing against the alert pole 33. Eventually, as the trip 43 reaches a final position 43B, it pushes the alert pole 33 free of the retainer 39 into a released position 33B. Once the alert pole 33 is free of the retainer 39, the spring 37 snaps the alert pole 33 into a vertical alert position, alerting the fisherman that a fish has struck the line 25.

The spring 37 slips into a receptacle or bore 45 in the base plate 19 and is held in place by friction. The spring 37, with the alert pole 33 attached, may be pulled out of the bore 45 for convenient storage when the tip-up is not in use.

As seen in FIG. 1, the base plate 19 overlies and completely covers the hole 13 in the ice 15, protecting the area underlying the base plate 19 from snow accumulation and refreezing of the water. When a fish is hooked, the base plate 19 is easily raised so that the fish can be removed from the water and unhooked. The only inlet into the area beneath the base plate 19 is the small opening in the guide 27 through which opening the line 25 is routed, and this opening is too small to permit wind or snow to enter the area beneath the base plate 19.

Accordingly, the present invention provides a mechanically simple ice fishing tip-up that can be economically manufactured, that is easy to use in cold weather, that is easy to move from place to place, and that can be conveniently stored even in very limited storage space.

Of course, various modifications and changes may be made with regard to the foregoing detailed description without departing from the spirit of the invention. It is therefore to be understood that, within the scope of the appended claims, the invention may be practiced otherwise than as specifically described.

I claim:

1. For use in ice fishing wherein a fishing line is disposed through an opening in a sheet of ice overlying a body of water through which opening a hooked fish is withdrawn, an improved ice fishing tip-up comprising:
   base plate means including guide means and having a planar undersurface for covering the opening and for engaging the surface of the ice surrounding and defining the opening, the guide means defining a guide hole extending through the base plate means and having a diameter approximating the diameter of the fishing line for guiding the fishing line through the opening:
   a fishing reel rotatably mounted on the base plate means;
   a trip member on the fishing reel, movable through a tripper path upon rotation of the fishing reel;
   a stationary non-rotatable hook shaped retainer affixed to the base plate means in spaced apart relation to the fishing reel;
   an alert pole carried by the base plate means opposite the fishing reel and engageable by the retainer for retention in a horizontal waiting position in the tripper path, the alert pole being engageable by the trip member for disengagement from the retainer for movement to a vertical alert position; and
   bias means tending to bias the alert pole to said afert position whereby a fish striking the fishing line is operative to cause rotation of the fishing reel and movement of the trip member into engagement with the alert pole in its waiting position to disengage the alert pole from the retainer and enable the bias means to urge the alert pole into its alert position.

2. For use in ice fishing wherein a fishing line is disposed through an opening in a sheet of ice overlying a body of water through which opening a hooked fish is withdrawn, an improved ice fishing tip-up comprising:
   generally circular base plate means having a planar undersurface for covering the opening and for engaging the surface of the ice surrounding and defining the opening, the base plate means also having a hole extending through its center portion;
   a fishing reel rotatably mounted on the base plate means with its axis of rotation generally perpendicular to the base plate means;
   a trip member on the fishing reel, movable through a tripper path upon rotation of the fishing reel;
   a stationary non-rotatable hook-shaped retainer affixed to the base plate means in spaced apart relation to the fishing reel;
   an alert pole carrier by the base plate means opposite the fishing reel and engageable by the retainer for retention in a horizontal waiting position in the tripper path, the alert pole being engageable by the trip member for disengagement from the retainer for movement to a vertical alert position;
   spring bias means connecting the alert pole to the base means and tending to bias the alert pole to said alert position; and
   guide means disposed over the hole in the base plate means and defining a guide hole having a diameter approximating the diameter of the fishing line for guiding the fishing line from the fishing reel through the hole in the base plate means whereby a fish striking the fishing line is operative to cause rotation of the fishing reel and movement of the trip member into engagement with the alert pole in its waiting position to disengage the alert pole from the retainer and enable the bias means to urge the alert pole into its alert position.

3. A tip-up according to claim 2 and including adjustable friction means operative upon the fishing reel to constrain rotation of the fishing reel in the absence of a torque of predetermined magnitude.

4. A tip-up according to claim 2 wherein the alert pole is removably carried by the base plate means for removal and storage when the tip-up is not in use.

* * * * *